United States Patent
Kose et al.

(10) Patent No.: US 9,214,665 B2
(45) Date of Patent: Dec. 15, 2015

(54) POSITIVE ELECTRODE MATERIAL MIXTURE, AND POSITIVE ELECTRODE FOR NON-AQUEOUS SECONDARY BATTERY AND SECONDARY BATTERY, EMPLOYING IT

(71) Applicant: ASAHI GLASS COMPANY, LIMITED, Chiyoda-ku (JP)

(72) Inventors: Takehiro Kose, Chiyoda-ku (JP); Mitsuru Seki, Chiyoda-ku (JP); Masao Iwaya, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 14 days.

(21) Appl. No.: 13/836,744

(22) Filed: Mar. 15, 2013

(65) Prior Publication Data

US 2013/0236783 A1   Sep. 12, 2013

Related U.S. Application Data

(63) Continuation of application No. PCT/JP2011/072464, filed on Sep. 29, 2011.

(30) Foreign Application Priority Data

Sep. 30, 2010  (JP) .................................. 2010-221222

(51) Int. Cl.

| | | |
|---|---|---|
| *H01M 4/131* | (2010.01) | |
| *H01M 4/62* | (2006.01) | |
| *H01M 4/13* | (2010.01) | |
| *H01M 10/052* | (2010.01) | |
| *H01M 4/1391* | (2010.01) | |
| *H01M 4/505* | (2010.01) | |
| *H01M 4/525* | (2010.01) | |
| *H01M 4/04* | (2006.01) | |
| *H01M 4/02* | (2006.01) | |

(52) U.S. Cl.
CPC ............... *H01M 4/131* (2013.01); *H01M 4/13* (2013.01); *H01M 4/1391* (2013.01); *H01M 4/505* (2013.01); *H01M 4/525* (2013.01); *H01M 4/623* (2013.01); *H01M 4/624* (2013.01); *H01M 10/052* (2013.01); *H01M 4/0404* (2013.01); *H01M 2004/021* (2013.01); *H01M 2004/028* (2013.01); *Y02E 60/122* (2013.01)

(58) Field of Classification Search
CPC .............................. H01M 4/131; H01M 4/623
USPC ................... 429/211; 252/182.1, 506; 427/58
See application file for complete search history.

(56) References Cited

U.S. PATENT DOCUMENTS

| | | | |
|---|---|---|---|
| 5,609,975 A | 3/1997 | Hasegawa et al. | |
| 6,682,856 B1 * | 1/2004 | Watanabe et al. | 429/326 |
| 2010/0092862 A1 * | 4/2010 | Nakai et al. | 429/185 |
| 2011/0062378 A1 * | 3/2011 | Chang et al. | 252/182.1 |
| 2011/0111295 A1 * | 5/2011 | Yamada | 429/217 |

FOREIGN PATENT DOCUMENTS

| | | | | |
|---|---|---|---|---|
| JP | 4-249860 | | 9/1992 | |
| JP | 10-233217 | | 9/1998 | |
| JP | 11025985 A | * | 1/1999 | ............ H01M 4/62 |
| JP | 11-162450 | | 6/1999 | |
| JP | 2000-90917 | | 3/2000 | |
| JP | 2001-273895 | | 10/2001 | |
| JP | 2010-225423 | | 10/2010 | |
| JP | 2011-181386 | | 9/2011 | |
| JP | 2011-228073 | | 11/2011 | |
| WO | WO 2009/098986 A1 | | 8/2009 | |
| WO | WO 2009/119202 A1 | | 10/2009 | |

OTHER PUBLICATIONS

International Search Report issued Dec. 27, 2011 in PCT/JP2011/072464 filed Sep. 29, 2011.

* cited by examiner

*Primary Examiner* — Karie O'Neill Apicella
(74) *Attorney, Agent, or Firm* — Oblon, McClelland, Maier & Neustadt, L.L.P

(57) ABSTRACT

To provide a positive electrode material mixture for a non-aqueous secondary battery, which is less likely to be gelled and has a good applicability to a current collector, and is capable of producing a battery capable of sufficiently exhibiting practical performance. A positive electrode material mixture which comprises a cathode active material, a binder containing a fluorinated copolymer having polymerized units derived from tetrafluoroethylene and polymerized units derived from propylene, and an aqueous medium, wherein the cathode active material is that the pH of a supernatant obtained by mixing the cathode active material with water is at least 10, and a positive electrode and a secondary battery, obtainable by employing it.

18 Claims, No Drawings

POSITIVE ELECTRODE MATERIAL MIXTURE, AND POSITIVE ELECTRODE FOR NON-AQUEOUS SECONDARY BATTERY AND SECONDARY BATTERY, EMPLOYING IT

TECHNICAL FIELD

The present invention relates to a positive electrode material mixture for a non-aqueous secondary battery, and a positive electrode for a non-aqueous secondary battery and a secondary battery, employing it.

BACKGROUND ART

In recent years, progress of electronic devices has been remarkable, and reduction in size and weight of portable electronic devices has been in progress at a rapid pace. Accordingly, batteries to be used as their power sources are also required to have a high energy density so that they can be made small in size and light in weight. Particularly, as a non-aqueous secondary battery, attention has been drawn to a lithium ion secondary battery.

A lithium ion secondary battery is constituted usually by components such as a positive electrode, a negative electrode, a non-aqueous electrolyte and a separator. Among them, the positive electrode is obtained usually by dispersing e.g. a cathode active material and an electrically conductive material in an organic solvent or water together with a binder, to prepare a positive electrode material mixture, which is then applied to the surface of a current collector, followed by evaporation of the solvent to fix the electrode active material to the electrode surface. If the binder fails to fix an adequate amount of the electrode active material to the electrode, a battery having a large initial capacity cannot be obtained, or the electrode active material falls off from the electrode by repetition of charge and discharge, whereby the capacity of the battery decreases.

As the positive electrode material mixture, an organic solvent type positive electrode material mixture or an aqueous positive electrode material mixture is obtainable by using an organic solvent type binder or an aqueous binder. Recently, attention has been drawn particularly to a positive electrode material mixture employing an aqueous binder, since it is thereby possible to reduce the production costs for an electrode by reducing use of an organic solvent and to improve the operation environment by reducing the environmental load.

As an organic solvent type binder, one having polyvinylidene fluoride (PVDF) dissolved in an organic solvent such as N-methylpyrrolidone is widely used (e.g. Patent Document 1). Further, as other binders having bonding properties or flexibility improved, polymers having vinylidene fluoride copolymerized with hexafluoropropylene, chlorotrifluoroethylene, tetrafluoroethylene or the like, are known (Patent Document 2).

As an aqueous binder, a latex of styrene/butadiene copolymer rubber or polytetrafluoroethylene produced by an emulsion polymerization method is known. However, polytetrafluoroethylene is poor in adhesion to a current collector and has had a problem such that when an external force is exerted, for example, in a winding up step, a cathode active material is likely to peel off from a metal foil as a current collector, or when used as a battery, the stability in long term charge/discharge cycles tends to decrease. Whereas, styrene/butadiene copolymer rubber is a rubber polymer and thus is excellent in flexibility and adhesion as compared with polyvinylidene fluoride or polytetrafluoroethylene, but oxidation resistance of the polymer is poor, and especially when the charging voltage is increased, its charge/discharge durability is inadequate.

On the other hand, with respect to a cathode active material, lithium cobaltate has heretofore been used in many cases, but various developments have been in progress from the viewpoint of the battery properties and safety, costs, etc. Particularly, a so-called three elements type cathode active material having the capacity increased by reducing highly costly cobalt as far as possible and replacing it with nickel, manganese or the like, has attracted attention as a positive electrode material for the next generation of lithium ion batteries. However, such a cathode active material containing a lithium atom has a high basicity and thus has a problem such that when a solution of a polymer having vinylidene fluoride polymerized is used as a binder, it is likely to be reacted with the polymer itself so that the positive electrode material mixture tends to be gelled. In order to solve such a problem, in an organic solvent type binder, a study has been made to reduce the basicity of the positive electrode material mixture by reducing water contained in the binder as far as possible or by using, as a cathode active material, one having a low basicity only (e.g. Patent Document 3). However, in a case where an aqueous binder containing water as the medium is to be used, it is unavoidable for a positive electrode material mixture to be basic, and accordingly, it has been desired to provide a positive electrode material mixture which is less likely to be gelled and which has high adhesion to a current collector, even in a system where a highly basic active material is used and further, to provide an electrode having excellent battery properties.

PRIOR ART DOCUMENTS

Patent Documents

Patent Document 1: JP-A-4-249860
Patent Document 2: JP-A-10-233217
Patent Document 3: JP-A-2000-90917

DISCLOSURE OF INVENTION

Technical Problem

It is an object of the present invention to provide a positive electrode material mixture for a non-aqueous secondary battery, which is less likely to be gelled and has a good applicability to a current collector even if a highly basic electrode active material is used, and which provides an excellent adhesion between the cathode active material and the current collector, presents little swelling of an electrode with an electrolyte at a high temperature and is capable of producing a non-aqueous secondary battery capable of sufficiently exhibiting practical performance, and a positive electrode for a non-aqueous secondary battery and a secondary battery, employing it.

Solution to Problem

The present invention provides the following:
[1] A positive electrode material mixture for a non-aqueous secondary battery, which comprises a cathode active material (a), a binder (b) containing a fluorinated copolymer having polymerized units derived from tetrafluoroethylene and polymerized units derived from propylene, and an aqueous medium, wherein the cathode active material (a) is such a cathode active material that the pH of a supernatant obtained by mixing 10 g of the cathode active material (a) with 100 cm³ of water at 25° C. for 5 minutes and thereafter allowing the same to stand still for one minute, is at least 10.

[2] The positive electrode material mixture for a non-aqueous secondary battery according to [1], wherein the cathode active material (a) is an oxide containing a nickel atom and a lithium atom.

[3] The positive electrode material mixture for a non-aqueous secondary battery according to [1] or [2], wherein the fluorinated copolymer has a weight average molecular weight of from 10,000 to 300,000.

[4] The positive electrode material mixture for a non-aqueous secondary battery according to any one of [1] to [3], wherein the binder (b) in the positive electrode material mixture has an average particle size of from 10 to 500 nm.

[5] The positive electrode material mixture for a non-aqueous secondary battery according to any one of [1] to [4], wherein the content of the cathode active material (a) in the positive electrode material mixture is from 10 to 90 mass %, and the content of the binder (b) is from 0.1 to 20 parts by mass per 100 parts by mass of the cathode active material (a).

[6] The positive electrode material mixture for a non-aqueous secondary battery according to any one of [1] to [5], wherein in the fluorinated copolymer, the ratio of the polymerized units derived from tetrafluoroethylene to the polymerized units derived from propylene is from 30/70 to 85/15 (mol %).

[7] The positive electrode material mixture for a non-aqueous secondary battery according to any one of [1] to [6], wherein the binder (b) in the positive electrode material mixture is used in the form of an aqueous dispersion or emulsion of the fluorinated copolymer.

[8] The positive electrode material mixture for a non-aqueous secondary battery according to any one of [1] to [7], wherein the positive electrode material mixture further contains an electrically conductive material in an amount of from 0.1 to 30 parts by mass per 100 parts by mass of the cathode active material (a).

[9] A process for producing a positive electrode for a non-aqueous secondary battery, which comprises applying the positive electrode material mixture for a non-aqueous secondary battery as defined in any one of [1] to [8] to a current collector and then removing the aqueous medium.

[10] A non-aqueous secondary battery comprising a negative electrode, an electrolyte, a separator and the positive electrode for a non-aqueous secondary battery obtained by the process as defined in [9].

Advantageous Effects of Invention

According to the present invention, it is possible to obtain a positive electrode material mixture for a non-aqueous secondary battery, which is less likely to be gelled and has a good applicability to a current collector and which has a high storage stability, even when a highly basic electrode active material is used.

Further, a positive electrode for a non-aqueous secondary battery and a non-aqueous secondary battery, obtainable by using the positive electrode material mixture for a non-aqueous secondary battery of the present invention, present little swelling of the electrode with an electrolyte even at a high temperature and provide a high mutual bonding property between the cathode active material and the current collector for the electrode and excellent charge/discharge properties even under such a condition that the charging voltage is high.

DESCRIPTION OF EMBODIMENTS

The positive electrode material mixture for a non-aqueous secondary battery of the present invention (hereinafter sometimes referred to simply as "the positive electrode material mixture") comprises a cathode active material (a), a binder (b) containing a fluorinated copolymer having polymerized units derived from tetrafluoroethylene and polymerized units derived from propylene (hereinafter sometimes referred to simply as "the fluorinated copolymer"), and an aqueous medium. Now, the respective components will be described below.

The cathode active material (a) to be used in the present invention, is such a cathode active material that the pH of a supernatant obtained by mixing 10 g of the cathode active material (a) with 100 cm³ of water at 25° C. for 5 minutes and thereafter allowing the same to stand still for one minute, is at least 10. The pH of the supernatant is preferably from 10 to 14, more preferably from 10 to 13, from the viewpoint of the storage stability of the electrode material mixture or the stability of the current collector to be coated. Such a highly basic compound may, for example, be a lithium-nickel composite oxide represented by the following formula (1) or a lithium-nickel-cobalt composite oxide represented by the following formula (2).

$$LiNi_xM_{1-x}O_2 \quad (1)$$

wherein M is at least one member selected from the group consisting of Al, B, Sn, Mn and Nb, and x is $0.1 \le x \le 1$.

$$LiNi_xCo_yM_{1-x-y}O_2 \quad (2)$$

wherein M is at least one member selected from the group consisting of Al, B, Sn, Mn and Nb, x is $0.1 \le x \le 0.9$, and y is $0.1 \le y \le 0.9$.

Specifically, the lithium-nickel composite oxide represented by the formula (1) may, for example, be $LiNiO_2$, $LiNi_{0.5}Mn_{0.5}O_2$, $LiNi_{0.75}Mn_{0.25}O_2$ or $LiNi_{0.25}Mn_{0.75}O_2$.

Specifically, the lithium-nickel-cobalt composite oxide represented by the formula (2) may, for example, be $LiNi_{0.8}Co_{0.2}O_2$, $LiNi_{0.7}Co_{0.3}O_2$, $LiNi_{0.5}Co_{0.5}O_2$, $LiNi_{1/3}Co_{1/3}Mn_{1/3}O_2$, $LiNi_{0.5}Co_{0.2}Mn_{0.3}O_2$, $LiNi_{0.5}Co_{0.3}Mn_{0.2}O_2$ or $LiNi_{0.75}Co_{0.15}Al_{0.1}O_2$.

Particularly preferred is $LiNi_{0.7}Co_{0.3}O_2$, $LiNi_{0.5}Co_{0.5}O_2$ or a lithium-nickel-cobalt-manganese composite oxide such as $LiNi_{0.5}Co_{0.2}Mn_{0.3}O_2$ or $LiNi_{1/3}Co_{1/3}Mn_{1/3}O_2$, which has a high capacity density and high stability.

The cathode active material (a) in the positive electrode material mixture of the present invention is preferably in a particle form.

The particle size of the cathode active material (a) is preferably from 0.1 to 50 μm, more preferably from 1 to 20 μm, with a view to improvement in the battery properties such as the charge/discharge capacity, cycle properties, etc.

The content of the cathode active material (a) in the positive electrode material mixture of the present invention is preferably from 10 to 90 mass %, more preferably from 20 to 80 mass %, most preferably from 30 to 70 mass %, based on the entire amount of the positive electrode material mixture. When the content of the cathode active material (a) is within such a range, the coating property and productivity of an electrode and the density of the active material in the electrode can be made high and good.

The positive electrode material mixture of the present invention may contain, in addition to the cathode active material (a), other cathode active materials. As such other cathode active materials, $LiCoO_2$, $LiMn_2O_4$, $LiMnO_2$, $LiFePO_4$, $LiMnPO_4$, etc. may be mentioned. The content of such other cathode active materials is preferably from 1 to 50 parts by mass, more preferably from 1 to 30 parts by mass, per 100 parts by mass of the cathode active material (a). When the content of other cathode active materials is within such a range, there may be a case where the safely, the charge/discharge cycle properties, etc. can be improved without impairing the characteristics of the present invention.

The present invention is preferably used for the production of a positive electrode for a lithium secondary battery, containing nickel, however, it can be used also for the production of a positive electrode wherein $LiMn_2O_4$ is used as the cathode active material (a). The present invention is preferably used particularly for the production of a positive electrode using highly basic $LiMn_2O_4$.

The binder (b) to be used in the present invention, is composed of a fluorinated copolymer having polymerized units derived from tetrafluoroethylene and polymerized units derived from propylene. When the fluorinated copolymer has such polymerized units, the alkali-resistance of the binder (b) is improved to present such effects that even in a case where a highly basic cathode active material is used, gelation is less likely to occur, the applicability to a current collector is good, the adhesion of cathode active material particles to one another or the adhesion between the cathode active material and the current collector is excellent, and swelling of an electrode with an electrolyte is little. The fluorinated copolymer has polymerized units derived from tetrafluoroethylene and polymerized units derived from propylene, however, it may have other polymerized units in addition to the polymerized units derived from tetrafluoroethylene and the polymerized units derived from propylene, as the case requires within a range not to impair the functions of the present invention, such as the alkali resistance of the fluorinated copolymer. A monomer to form such other polymerized units may, for example, be a fluorinated monomer or a hydrocarbon monomer.

As the fluorinated monomer, it is possible to use a fluorinated olefin such as vinylidene fluoride, propylene hexafluoride, chlorotrifluoroethylene or perfluorobutylethylene, or a fluorinated vinyl ether such as perfluoropropyl vinyl ether or perfluoromethyl vinyl ether.

The hydrocarbon monomer may, for example, be an α-olefin such as ethylene or 1-butene, a vinyl ether such as ethyl vinyl ether, butyl vinyl ether or hydroxybutyl vinyl ether, or a vinyl ester such as vinyl acetate or vinyl benzoate.

However, as the fluorinated copolymer, more preferred is a fluorinated copolymer composed solely of polymerized units derived from tetrafluoroethylene and polymerized units derived from propylene, since the alkali resistance, oxidation resistance, resistance against swelling with an electrolyte, adhesion and flexibility are thereby good.

In the composition of the fluorinated copolymer to be used in the present invention, the ratio of the polymerized units derived from tetrafluoroethylene to the polymerized units derived from propylene is preferably within a range of from 30/70 to 85/15 (mol %), more preferably from 40/60 to 70/30, particularly preferably from 50/50 to 60/40. Within such a range of the compositional ratio, there will be no gelation of the positive electrode material mixture, and it is possible to obtain an electrode which is excellent in the storage stability, has a good coating property, is less swelling with a solvent of an electrolyte at a high temperature and has a good adhesion between the current collector and the electrode.

Further, in a case where the fluorinated copolymer has the above-mentioned other polymerized units, the content of such other polymerized units is preferably at most 10 mol %, more preferably at most 5 mol %, particularly preferably at most 1 mol %, in all polymerized units contained in the fluorinated copolymer.

In a case where the above fluorinated copolymer is to be used as the binder (b), one fluorinated copolymer may be used alone, or two or more copolymers different in the composition of polymerized units may be used in combination. Further, as the case requires, it is also possible to use another fluorinated or non-fluorinated polymer compound in combination.

The weight average molecular weight of the fluorinated copolymer is from 10,000 to 300,000, preferably from 20,000 to 250,000, more preferably from 20,000 to 200,000, particularly preferably from 30,000 to 190,000. If the weight average molecular weight is smaller than 10,000, swelling with an electrolyte tends to be likely, and if the molecular weight exceeds 300,000, the bonding property tends to deteriorate. The weight average molecular weight may be adjusted by a known method, such as addition of a chain transfer agent, or control of the polymerization temperature, polymerization pressure, etc.

The fluorinated copolymer can be produced by a known method such as suspension polymerization, emulsion polymerization or solution polymerization. The fluorinated copolymer obtained by polymerization may be in the form of a dispersion or emulsion as dispersed in an aqueous medium such as water, or a solution as dissolved in a solvent, but it is preferably in the form of a dispersion or emulsion as dispersed in an aqueous medium, whereby the dispersibility of the fluorinated copolymer is good, and it is possible to use the fluorinated copolymer obtained by polymerization, as it is, as a raw material for producing an electrode material mixture of the present invention. As a polymerization method for the fluorinated copolymer, emulsion polymerization is most preferred, since it is thereby possible to obtain a fluorinated copolymer in such a dispersion or emulsion state. Further, the fluorinated copolymer obtained by polymerization may be purified to obtain a solid, which may be dispersed again in an aqueous medium to obtain a dispersion for use.

In a case where an emulsion polymerization method or a suspension polymerization method is employed as a method for producing the fluorinated copolymer, an emulsifier or a dispersant may be used, and an emulsifier or a dispersant which is employed in a usual emulsion polymerization method or a suspension polymerization method, may be used. As such an emulsifier or a dispersant, an ionic emulsifier is preferred, and an anionic emulsifier is more preferred, since the latex will be thereby excellent in mechanical and chemical stability.

As such an anionic emulsifier, a known emulsifier may be used. Specific examples include a hydrocarbon emulsifier (such as sodium lauryl sulfate or sodium dodecylbenzene sulfonate), a fluorinated alkylcarboxylate (such as ammonium perfluorooctanoate or ammonium perfluorohexanoate), a compound represented by the following formula (I) (hereinafter referred to as the compound (I)), etc.

$$F(CF_2)_pO(CF(X)CF_2O)_qCF(X)COOA \qquad (I)$$

wherein X is a fluorine atom or a $C_{1-3}$ perfluoroalkyl group, A is a hydrogen atom, an alkali metal or $NH_4$, p is an integer of from 1 to 10, and q is an integer of from 0 to 3.

As the compound (I), the following compounds may be mentioned.

$F(CF_2)_2OCF_2CF_2OCF_2COONH_4$,

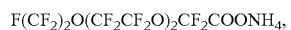
$F(CF_2)_2O(CF_2CF_2O)_2CF_2COONH_4$,

$F(CF_2)_3O(CF(CF_3)CF_2O)_2CF(CF_3)COONH_4$,

$F(CF_2)_3OCF_2CF_2OCF_2COONH_4$,

$F(CF_2)_3O(CF_2CF_2O)_2CF_2COONH_4$, $F(CF_2)_4OCF_2CF_2OCF_2COONH_4$, $F(CF_2)_4O(CF_2CF_2O)_2CF_2COONH_4$, $F(CF_2)_2OCF(CF_3)CF_2OCF(CF_3)COONH_4$, $F(CF_2)_2OCF_2CF_2OCF_2COONa$, $F(CF_2)_2O(CF_2CF_2O)_2CF_2COONa$, $F(CF_2)_3OCF_2CF_2OCF_2COONa$, $F(CF_2)_3O(CF_2CF_2O)_2CF_2COONa$, $F(CF_2)_4OCF_2CF_2OCF_2COONa$, $F(CF_2)_4O(CF_2CF_2O)_2CF_2COONa$, etc.

The content of the emulsifier is preferably from 0.01 to 15 parts by mass, more preferably from 0.1 to 10 parts by mass, per 100 parts by mass of the aqueous medium.

The binder (b) composed of the fluorinated copolymer of the present invention is preferably in the form of fine particles.

It is preferred that the above fluorinated copolymer is dispersed in the positive electrode material mixture in the form of particles having an average particle size of from 10 to 500 nm. The lower limit of the average particle size is more preferably 20 nm, further preferably 30 nm, most preferably 50 nm. Further, the upper limit of the average particle size is more preferably 300 nm, further preferably 200 nm, still further preferably 150 nm, most preferably 100 nm. When the average particle size is within the above range, the fluorinated copolymer will not densely cover the entire surface of the cathode active material, whereby the internal resistance tends to be low, and the bonding force as a binder of the fluorinated copolymer is less likely to decrease. The average particle size of the binder (b) can be adjusted by a known method of e.g. adjusting the type, amount, etc. of the emulsifier. Here, the average particle size of particles of the fluorinated copolymer can be measured by a dynamic light scattering method by means of Laser Zeta-potential Analyzer ELS-8000 manufactured by Otsuka Electronics Co., Ltd.

The content of the binder (b) in the positive electrode material mixture of the present invention is preferably from 0.1 to 20 parts by mass, more preferably from 1 to 10 parts by mass, most preferably from 1 to 8 parts by mass, per 100 parts by mass of the cathode active material. When the content of the binder (b) is within this range, the adhesion can be made excellent while suppressing an increase of the internal resistance of the electrode.

The positive electrode material mixture of the present invention may contain, in addition to the binder (b), other binders. Such other binders may, for example, be a polyethylene oxide (PEO), a fluorinated resin such as a polytetrafluoroethylene (PTFE), a tetrafluoroethylene/perfluoroalkyl vinyl ether copolymer (PFA), a tetrafluoroethylene/hexafluoropropylene copolymer (FEP) or an ethylene/tetrafluoroethylene copolymer (ETFE), a polyethylene, a polypropylene, an aramid resin, a polyamide, a polyimide, a polyamide imide, a polyacrylnitrile, a polyacrylic acid, a polyacrylic acid methyl ester, a polyacrylic acid ethyl ester, a polyacrylic acid hexyl ester, a polymethacrylic acid, a polymethacrylic acid methyl ester, a polymethacrylic acid ethyl ester, a polymethacrylic acid hexyl ester, a polyvinyl acetate, a polyvinyl pyrrolidone, a polyether, a polyethersulfone, a hexafluoropropylene, a styrene butadiene rubber, etc.

The content of other binders is preferably from 0.1 to 50 parts by mass, more preferably from 0.1 to 30 parts by mass, per 100 parts by mass of the binder (b). When the content of other binders is within this range, there may be a case where the adhesion, etc. can be improved without impairing the properties of the positive electrode material mixture of the present invention.

The aqueous medium in the positive electrode material mixture of the present invention essentially contains water and may further contain an organic solvent which can be mixed with water in an optional proportion. As such an organic solvent, an alcohol such as methanol, ethanol, propanol, isopropanol, n-butanol or t-butanol, is preferred. In the aqueous medium, the content of the organic solvent should better be small, and it is particularly preferred that no organic solvent is contained. The content of an organic solvent in the positive electrode material mixture of the present invention is preferably from 0 to 10 mass %, more preferably from 0 to 1 mass %, most preferably from 0 to 0.1 mass %. When the content of the organic solvent is within this range, the stability of the binder (b) can be maintained, no agglomeration will take place during the preparation of the positive electrode material mixture, and the bonding property will be good.

The positive electrode material mixture of the present invention preferably contains an electrically conductive material. By using an electrically conductive material, it is possible to improve the electrical contact of electrode active material particles to one another thereby to lower the electrical resistance in the active material layer and to improve the discharge rate properties of the non-aqueous secondary battery. As such an electrically conductive material, a conductive carbon such as acetylene black, Ketjenblack, carbon black, graphite, gas-phase grown carbon fibers, or carbon nanotubes, may, for example, be mentioned. The content of the electrically conductive material in the positive electrode material mixture is preferably from 0.1 to 30 parts by mass, more preferably from 1 to 10 parts by mass, per 100 parts by mass of the cathode active material (a). When the positive electrode material mixture contains an electrically conductive material in an amount within this range, the effect to reduce the electrical resistance is substantial and good with an addition of a small amount of the electrically conductive material.

The positive electrode material mixture of the present invention is produced by mixing the cathode active material (a), the binder (b), the aqueous medium and, as the case requires, other components such as an electrically conductive material. Specifically, it is preferred to mix a dispersion or emulsion having the binder (b) composed of the fluorinated copolymer dispersed in an aqueous medium, to a mixture comprising the cathode active material (a), the aqueous medium and, as the case requires, other components such as an electrically conductive material.

The binder (b) is preferably used in the form of an aqueous dispersion of the fluorinated copolymer, i.e. in the form of a dispersion or emulsion as dispersed in an aqueous medium, obtainable by emulsion polymerization as mentioned above. The concentration of the fluorinated copolymer in such a dispersion or emulsion is preferably from 5 to 60 mass %, more preferably from 10 to 50 mass %, particularly preferably from 15 to 35 mass %. When the concentration of the fluorinated copolymer is within this range, the dispersion stability of the binder in the aqueous dispersion will be excellent. Further, a preferred range of the average particle size of particles of the fluorinated copolymer in the dispersion or emulsion is the same as the above-mentioned average particle size of the fluorinated copolymer contained in the positive electrode material mixture.

Additives such as a viscosity modifier, a fluidizer, etc. to improve the coating properties may be incorporated to the positive electrode material mixture of the present invention. Specific examples of such additives include cellulose polymers such as carboxymethylcellulose, methylcellulose, hydroxypropylcellulose, etc., polyacrylates such as sodium polyacrylate, water-soluble polymers such as polyvinyl alcohol, polyethylene oxide, polyvinylpyrrolidone, a copolymer of vinyl alcohol with acrylic acid or an acrylate, a completely or partially saponified copolymer of vinyl acetate with maleic anhydride, maleic acid or fumaric acid, modified polyvinyl alcohol, modified polyacrylic acid, polyethylene glycol, polycarboxylic acid, an ethylene/vinyl alcohol copolymer, vinyl acetate polymer, etc. The proportion of such additives to be used may freely be selected as the case requires within a range not to impair the characteristics of the present invention.

To the positive electrode material mixture of the present invention, a pH regulator to adjust the pH of the electrode material mixture may be added. By such a pH regulator, the pH of the slurry can be easily adjusted. The type of the pH regulator is not particularly limited, however, a substance showing acidity, an organic acid such as phthalic acid, succinic acid or maleic acid, or an inorganic acid such as hydrochloric acid, sulfuric acid or phosphoric acid, is preferred.

A positive electrode for a non-aqueous secondary battery of the present invention can be obtained by applying the positive electrode material mixture of the present invention to a current collector, then removing the aqueous medium, and as the case requires, forming into a desired thickness by pressing. Various coating methods may be mentioned as a method to apply the positive electrode material mixture for a non-aqueous secondary battery of the present invention to a current collector. For example, a method for applying by means of a coating tool such as a doctor blade may be mentioned. The application temperature is not particularly limited and is usually preferably a temperature around room temperature. Drying may be carried out by means of various dryers. For example, a heating type vacuum dryer may be mentioned. The drying temperature is not particularly limited, and it is usually preferably from room temperature to 150° C. The pressing method may be carried out by means of a die press or a roll press.

The current collector is not particularly limited so long as it is one made of an electrically conductive material, but it may usually be a metal foil, a metal net, a metal madreporite or the like, of aluminum, a stainless steel or the like, and aluminum is particularly preferred.

The thickness of the current collector is preferably from 1 to 100 μm. If the thickness is less than 1 μm, the durability of the battery tends to be inadequate, and the reliability of the battery tends to be low. On the other hand, if it exceeds 100 μm, the mass of the battery increases.

The thickness of the coating layer of the positive electrode material mixture is preferably from 0.5 to 2,000 μm, more preferably from 1 to 1,000 μm, particularly preferably from 10 to 500 μm, as the thickness after drying.

The non-aqueous secondary battery of the present invention comprises the positive electrode for a non-aqueous secondary battery of the present invention and further comprises a negative electrode, a separator and a non-aqueous electrolyte. As the negative electrode, it is possible to use a negative electrode which is commonly used, and a negative electrode may, for example, be mentioned wherein a negative electrode material mixture comprising lithium metal or a lithium alloy such as a lithium/aluminum alloy, an anode active material and a binder, is held on a negative electrode current collector.

The positive electrode for a non-aqueous secondary battery of the present invention is useful for a battery of any form such as a cylindrical form, a sheet form, an angular form, etc. And, a non-aqueous secondary battery using the electrode of the present invention for the positive electrode and/or negative electrode and having a separator between the positive and negative electrodes and a non-aqueous electrolyte accommodated in a case, has high reliability even at a high temperature.

As a separator, a fine porous polymer film is used, and its material may, for example, be a nylon resin, a polyester resin, a cellulose acetate resin, a nitrocellulose resin, a polysulfone resin, a polyacrylonitrile resin, a polyvinylidene fluoride resin, a tetrafluoroethylene resin, a tetrafluoroethylene/ethylene copolymer resin, a polypropylene resin or a polyethylene resin.

The non-aqueous electrolyte may, for example, be an aprotic organic solvent such as propylene carbonate, ethylene carbonate, dimethyl carbonate, ethyl methyl carbonate, diethyl carbonate, γ-butyrolactone or diethoxyethane. Further, the electrolyte salt may, for example, be a lithium salt such as $LiClO_4$, $LiBF_4$, $LiPF_6$, $LiAsF_6$, $CF_3SO_3Li$ or $(CF_3SO_2)_2NLi$.

EXAMPLES

Now, Examples of the present invention will be described. However, the following Examples are merely exemplary, and the present invention is by no means limited thereto.

The tests and evaluations in Examples and Comparative Examples are carried out by the following methods.

(1) Measurement of pH of Cathode Active Material

Into a beaker made of glass and having an internal capacity of 300 cm$^3$, 100 cm$^3$ of water at 25° C. and 10 g of a cathode active material were added, stirred by a PTFE-coated stirrer at 100 rpm at 25° C. for 5 minutes and then left to stand for 1 minute, and after visually confirming that no cathode active material was observed in the supernatant, only the supernatant was sampled, and the pH of the supernatant at 25° C. was measured by a pH meter (HM-20P) manufactured by DKK-TOA Corporation.

(2) Weight Average Molecular Weight

The weight average molecular weight of a fluorinated copolymer was measured by gel permeation chromatography (GPC) under the following conditions.
 GPC apparatus: HLC-8220, by Tosoh Corporation
 Column: shodex KF-806M (two columns), shodex KF-802 (one column), manufactured by Showa Denko K.K.
 Detector: RI detector (differential refractometer)
 Solvent: tetrahydrofuran
 Temperature: 40° C.
 Flow rate: 1.0 mL/min
 Concentration: 0.5 mass %

(3) Average Particle Size

The average particle size of fine particles of a binder made of a fluorinated copolymer in the binder was measured by a dynamic light scattering method by means of Laser Zeta Electrometer ELS-8000, manufactured by Otsuka Electronics Co., Ltd.

(4) Copolymer Composition

A fluorinated copolymer was dissolved in deuterated tetrahydrofuran, and 13C-NMR was measured to analyze the copolymer composition of the fluorinated copolymer.

(5) Adhesion (Peel Strength)

An electrode produced by applying a positive electrode material mixture to a current collector, was cut in a strip form of 2 cm in width×10 cm in length and fixed so that the coating film surface of the positive electrode material mixture faced upward. An adhesive tape was bonded to the coating film surface of the positive electrode material mixture, and the tape was peeled in a 90° direction at a rate of 10 mm/min, whereby the strength (N) was measured. This measurement was repeated five times, and the average value of the strength was taken as the peel strength. The larger the value, the better the adhesion (bonding property).

(6) Electrolytic Solution Resistance

As electrolytic solution resistance, the degree of swelling of an electrode with a solvent of a non-aqueous electrolytic solution was evaluated. An electrode was immersed in a mixed solution of propylene carbonate/ethylene carbonate=50/50 (vol %) at 100° C., and the time (hereinafter referred to as "peel time") until the coating film of the positive electrode material mixture for a non-aqueous secondary battery is peeled from the metal foil by swelling, was measured. The longer the time, the smaller the degree of swelling and the better the electrolytic solution resistance.

(7) Charge/Discharge Properties

With respect to a coin-form non-aqueous electrolyte secondary battery of the present invention, charging was carried out at 25° C. at a constant current corresponding to 0.2 C to 4.3V (the voltage represents a voltage to lithium), further charging was carried out at the charging upper limit voltage until the current value became 0.02 C, and then, discharging was carried out at a constant current corresponding to 0.2 C to 3V, to complete a cycle. The capacity retention (unit: %) of the discharge capacity in the 20th cycle to the discharge capacity at the time of discharging in the first cycle was obtained and used as an index for the charge/discharge measurement of the battery. The higher the value of the capacity retention, the better.

Here, 1 C represents a value of the current at which a standard capacity of a battery is discharged in 1 hour, and 0.5 C represents a current value corresponding to ½ thereof.

(8) Storage Stability of Positive Electrode Material Mixture

By means of a BM model rotation viscometer, an obtained positive electrode material mixture was measured at 25° C. at a rotational speed of No. 3 rotor of 30 rpm. Measurements were carried out with respect to one immediately after the preparation and one after storage at 25° C. for 1 day, whereupon the change in viscosity as between before and after the storage was used as an index for the storage stability of the positive electrode material mixture.

(9) pH of Positive Electrode Material Mixture

The pH of an obtained positive electrode material mixture was measured at 25° C. by means of a pH meter (HM-20P) manufactured by DKK-TOA Corporation.

Production Example 1

The interior of a stainless steel pressure resistant reactor having an internal capacity of 3,200 mL and equipped with stirring anchor vanes, was deaerated, and then to the reactor, 1,700 g of deionized water, 58 g of disodium hydrogen phosphate 12 hydrate, 1.0 g of sodium hydroxide, 9 g of sodium lauryl sulfate and 4.4 g of ammonium persulfate were added. The pH of the aqueous medium in the reactor was 9.5 at that time.

Then, at 75° C., a monomer mixed gas of tetrafluoroethylene (hereinafter referred to as TFE)/propylene (hereinafter referred to as P) i.e. TFE/P=88/12 (molar ratio) was injected under pressure so that the internal pressure of the reactor became 2.50 MPaG. By rotating anchor vanes at 300 rpm, a polymerization reaction was initiated.

Along with the progress of the polymerization, the pressure in the reactor decreased, and when the internal pressure of the reactor decreased to 2.49 MPaG, a monomer mixed gas of TFE/P=56/44 (molar ratio) was injected under the self pressure to raise the internal pressure of the reactor to 2.51 MPaG. This operation was repeated to maintain the internal pressure of the reactor to be from 2.49 to 2.51 MPaG, and the polymerization reaction was continued. When the total amount of the injected amount of the monomer mixed gas of TFE/P became 900 g, the internal temperature of the reactor was cooled to 10° C. to stop the polymerization reaction and to obtain a binder being a latex containing fluorinated copolymer A. The polymerization time was 8 hours. The solid content in the binder was 34 mass %, and the average particle size of fine particles of the binder made of the fluorinated copolymer A was 80 nm. The weight average molecular weight of fluorinated copolymer A was 130,000, and the copolymer composition was repeating units derived from TFE/repeating units derived from P=56/44 (molar ratio).

Production Example 2

The interior of a stainless steel pressure resistant reactor having an internal capacity of 3,200 mL and equipped with stirring anchor vanes, was deaerated, and then, to the reactor, 1,700 g of deionized water, 58 g of disodium hydrogen phosphate 12 hydrate, 1.0 g of sodium hydroxide, 9 g of sodium lauryl sulfate, and 4.4 g of ammonium persulfate were added. Further, an aqueous solution having 0.4 g of disodium ethylenediamine tetraacetate dihydrate (hereinafter referred to as EDTA) and 0.3 g of ferrous sulfate heptahydrate dissolved in 200 g of deionized water, was added to the reactor. The pH of the aqueous medium in the reactor was 9.5 at that time.

Then, at 40° C., a monomer mixed gas of TFE/P=88/12 (molar ratio) was injected under pressure so that the internal pressure of the reactor became 2.50 MPaG. By rotating the anchor vanes at 300 rpm, an aqueous solution containing 2.5 mass % of sodium hydroxymethanesulfinate dihydrate (hereinafter referred to as Rongalite) having the pH adjusted to 10.0 with sodium hydroxide, was added to the reactor to initiate a polymerization reaction. Thereafter, an aqueous solution containing 2.5 mass % of Rongalite was continuously added to the reactor by means of a high pressure pump.

Along with the progress of the polymerization, the pressure in the reactor decreased, and when the internal pressure of the reactor decreased to 2.49 MPaG, a monomer mixed gas of TFE/P=56/44 (molar ratio) was injected under the self pressure to raise the internal pressure of the reactor to 2.51 MPaG. This operation was repeated to maintain the internal pressure of the reactor to be from 2.49 to 2.51 MPaG, and the polymerization reaction was continued. When the total amount of the injected amount of the monomer mixed gas of TFE/P became 900 g, addition of the aqueous solution containing 2.5 mass % of Rongalite was stopped, and the internal temperature of the reactor was cooled to 10° C. to terminate the polymerization reaction and to obtain a binder being a latex containing fluorinated copolymer B. The amount of the aqueous solution containing 2.5 mass % of Rongalite was 63 g. The polymerization time was 8 hours. The solid content in the binder was 34 mass %, and the average particle size of fine particles of the binder made of the fluorinated copolymer was 120 nm. The weight average molecular weight of fluorinated copolymer B was 180,000, and the copolymer composition was repeating units derived from TFE/repeating units derived from P=56/44 (molar ratio).

Production Example 3

A binder being a latex containing fluorinated copolymer C was obtained in the same manner as in Production Example 1 except that the temperature during the polymerization was changed to 25° C. The amount of the aqueous solution containing 2.5 mass % of Rongalite was 58 g. The polymerization time was 9 hours. The solid content in the binder composition was 33 mass %, and the average particle size of fine particles of the binder made of the fluorinated copolymer was 150 nm. The weight average molecular weight of fluorinated copolymer C was 280,000, and the copolymer composition was repeating units derived from TFE/repeating units derived from P=56/44 (molar ratio).

Production Example 4

A binder being a latex containing fluorinated copolymer D was obtained in the same manner as in Production Example 1 except that the temperature during the polymerization was changed to 15° C. The amount of the aqueous solution containing 2.5 mass % of Rongalite was 50 g. The polymerization time was 12 hours. The solid content in the binder was 32 mass %, and the average particle size of fine particles of the binder made of the fluorinated copolymer was 200 nm. The weight average molecular weight of fluorinated copolymer D was 330,000, and the copolymer composition was repeating units derived from TFE/repeating units derived from P=56/44 (molar ratio).

Example 1

To 10 parts by mass of a 2 mass % sodium carboxymethylcellulose aqueous solution, 95 parts by mass of $LiNi_{1/3}Co_{1/3}Mn_{1/3}O_2$ having an average particle size of 10 μm as a cathode active material and 5 parts by mass of acetylene black were mixed, and water was added and stirred so that the solid content concentration became 70 mass %. Then, 5 parts by mass of a binder containing fluorinated copolymer A obtained in Production Example 1 was added and stirred to obtain a uniform positive electrode material mixture. The pH of the positive electrode material mixture was 12.2. Further, the obtained positive electrode material mixture was applied to an aluminum foil (current collector) having the surface roughened and having a thickness of 15 μm, by means of a doctor blade, so that the thickness after drying would be 120 μm, and dried in a vacuum drier at 120° C. and then rolled by a roll press at room temperature so that the coating layer would be 100 μm, followed by cutting out in a circular shape with a diameter of 18 mm to obtain a positive electrode 1.

Further, the positive electrode 1, a lithium metal foil having the same area as the positive electrode, and a separator made of polyethylene were laminated in the order of the lithium metal foil, the separator and the $LiNi_{1/3}Co_{1/3}Mn_{1/3}O_2$ positive electrode in a 2016 model coin cell to prepare a battery element, and a non-aqueous electrolytic solution of 1M-$LiPF_6$ ethyl methyl carbonate/ethylene carbonate (volume ratio of 1:1) was added, followed by sealing to prepare a coin-type non-aqueous electrolyte secondary battery 1.

The evaluation results are shown in Table 1.

Further, 100 $cm^3$ of water and 10 g of $LiNi_{1/3}Co_{1/3}Mn_{1/3}O_2$ were mixed for 5 minutes and then left to stand still for 1 minute, and the pH of the supernatant thereby obtained was 12.0.

Comparative Example 1

95 Parts by mass of $LiNi_{1/3}Co_{1/3}Mn_{1/3}O_2$ having an average particle size of 10 μm, as used in Example 1, and 5 parts by mass of acetylene black were mixed, and 100 parts by mass of an N-methylpyrrolidone solution containing 10 mass % of polyvinylidene fluoride, was added and stirred to obtain a uniform positive electrode material mixture. The subsequent operation was the same as in Example 1, whereby a positive electrode 2 and a coin-type non-aqueous electrolyte secondary battery 2 were obtained. The evaluation results are shown in Table 1.

Comparative Example 2

A positive electrode material mixture was obtained in the same manner as in Example 1 except that instead of the binder containing fluorinated copolymer A obtained in Production Example 1, 3 parts by mass of a polytetrafluoroethylene aqueous dispersion having a solid content concentration of 50%, was added. The subsequent operation was carried out in the same manner, whereby a positive electrode 3 and a coin-type non-aqueous electrolyte secondary battery 3 were obtained. The evaluation results are shown in Table 1.

TABLE 1

| Properties | Evaluation items (units) | Ex. 1 | Comp. Ex. 1 | Comp. Ex. 2 |
|---|---|---|---|---|
| Adhesion | Peel strength (N) | 0.30 | 0.08 | 0.04 |
| Electrolytic solution resistance | Peel time (min) | 300 | 90 | 200 |
| Charge/discharge properties | Capacity retention (%) | 99 | 85 | 88 |
| Viscosity of positive electrode material mixture | Viscosity immediately after preparation (mPa · s) | 1,200 | 1,000 | 3,000 |
| | Viscosity after 1 day (mPa · s) | 1,400 | 5,400 | 3,400 |

Example 2

A positive electrode 4 having a coating film of a positive electrode material mixture, and a coin-type non-aqueous electrolyte secondary battery 4, were obtained in the same manner as in Example 1 except that instead of the binder containing fluorinated copolymer A obtained in Production Example 1, the binder containing fluorinated copolymer B obtained in Production Example 2 was used. The pH of the positive electrode material mixture was 12.3. The evaluation results are shown in Table 2.

Example 3

A positive electrode 5 having a coating film of a positive electrode material mixture, and a coin-type non-aqueous electrolyte secondary battery 5, were obtained in the same manner as in Example 1 except that instead of the binder containing fluorinated copolymer A obtained in Production Example 1, the binder containing fluorinated copolymer C obtained in Production Example 3 was used. The pH of the positive electrode material mixture was 12.1. The evaluation results are shown in Table 2.

Example 4

A positive electrode 6 having a coating film of a positive electrode material mixture, and a coin-type non-aqueous electrolyte secondary battery 6, were obtained in the same manner as in Example 1 except that instead of the binder containing fluorinated copolymer A obtained in Production Example 1, the binder containing fluorinated copolymer D obtained in Production Example 4 was used. The pH of the positive electrode material mixture was 12.0. The evaluation results are shown in Table 2.

TABLE 2

| Properties | Evaluation items (units) | Ex. 2 | Ex. 3 | Ex. 4 |
|---|---|---|---|---|
| Adhesion | Peel strength (N) | 0.23 | 0.20 | 0.15 |
| Electrolytic solution resistance | Peel time (min) | 250 | 220 | 180 |
| Charge/discharge properties | Capacity retention (%) | 97 | 95 | 93 |

Example 5

Using the coin-type non-aqueous electrolyte secondary battery 1 prepared in Example 1 of the present invention, at a temperature of 25° C., charging was carried out at a constant current corresponding to 0.2 C to 4.5V (the voltage represents a voltage to lithium), further charging was carried out at the charging upper limit voltage until the current value became 0.02 C, and then, discharging was carried out at a constant current corresponding to 0.2 C to 3V, to complete a cycle. The discharge capacity in the 10th charge/discharge cycle to the discharge capacity in the first cycle was obtained as the capacity retention. The result is shown in Table 3.

Comparative Example 3

The capacity retention was obtained in the same manner as in Example 5 by using the coin-type non-aqueous electrolyte secondary battery 2 prepared in Comparative Example 1. The result is shown in Table 3.

TABLE 3

| Charge/discharge properties | Ex. 5 | Comp. Ex. 3 |
|---|---|---|
| Capacity retention (%) | 93 | 75 |

Example 6

A positive electrode 7 having a coating film of a positive electrode material mixture, and a coin-type non-aqueous electrolyte secondary battery 7, were obtained in the same manner as in Example 1 except that instead of $LiNi_{1/3}Co_{1/3}Mn_{1/3}O_2$ having an average particle size of 10 μm as a cathode active material, $LiNi_{0.5}Co_{0.2}Mn_{0.3}O_2$ having an average particle size of 10 μm was used. The pH of the positive electrode material mixture was 12.6. The evaluation results are shown in Table 4. Further, 100 cm$^3$ of water and 10 g of $LiNi_{0.5}Co_{0.2}Mn_{0.3}O_2$ were mixed for 5 minutes and then left to stand still for 1 minute, and the pH of the supernatant thereby obtained was 12.6.

Comparative Example 4

A positive electrode 8 having a coating film of a positive electrode material mixture, and a coin-type non-aqueous electrolyte secondary battery 8, were obtained in the same manner as in Comparative Example 1 except that instead of $LiNi_{1/3}Co_{1/3}Mn_{1/3}O_2$ having an average particle size of 10 μm as a cathode active material, $LiNi_{0.5}Co_{0.2}Mn_{0.3}O_2$ having an average particle size of 10 μm was used. The evaluation results are shown in Table 4.

TABLE 4

| Properties | Evaluation items (units) | Ex. 6 | Comp. Ex. 4 |
|---|---|---|---|
| Adhesion | Peel strength (N) | 0.35 | 0.08 |
| Electrolytic solution resistance | Peel time (min) | 300 | 85 |
| Charge/discharge properties | Capacity retention (%) | 99 | 80 |
| Viscosity of positive electrode material mixture | Viscosity immediately after preparation (mPa·s) | 1,400 | 2,000 |
| | Viscosity after 1 day (mPa·s) | 1,500 | 8,000 |

Even in a combination with a highly basic cathode active material, the positive electrode material mixture of the present invention shows an excellent storage stability, and the obtainable positive electrode is excellent in adhesion to a current collector, has high durability against an electrolytic solution and shows an excellent cycle stability in the charge/discharge properties of the battery. On the other hand, it is evident that the solvent-type positive electrode material mixture using vinylidene fluoride loses the storage stability and undergoes gelation under a strongly basic condition, and also the obtainable positive electrode is poor in adhesion and poor in the cycle properties of the battery. Further, also in a case where polytetrafluoroethylene is used as an aqueous binder, the adhesion is poor.

Further, it is evident that the positive electrode 1 of the present invention has a high capacity retention even in charge/discharge at a high voltage of 4.5V.

INDUSTRIAL APPLICABILITY

The positive electrode material mixture for a non-aqueous secondary battery of the present invention is useful for the production of an electrode for a lithium ion secondary battery wherein a highly basic cathode active material is employed.

This application is a continuation of PCT Application No. PCT/JP2011/072464, filed on Sep. 29, 2011, which is based upon and claims the benefit of priority from Japanese Patent Application No. 2010-221222 filed on Sep. 30, 2010. The contents of those applications are incorporated herein by reference in its entirety.

What is claimed is:

1. A positive electrode material mixture for a non-aqueous secondary battery, which comprises:
   a cathode active material;
   a binder comprising a fluorinated copolymer having polymerized units derived from tetrafluoroethylene and polymerized units derived from propylene such that a ratio of the polymerized units derived from tetrafluoroethylene to the polymerized units derived from propylene is in a range of from 50/50 to 60/40; and
   an aqueous medium,
   wherein the cathode active material is such a cathode active material that a pH of a supernatant obtained by mixing 10 g of the cathode active material with 100 cm$^3$ of water at 25° C. for 5 minutes and thereafter allowing a mixture to stand still for one minute, is at least 10, the cathode active material is $LiNi_{0.5}Mn_{0.5}O_2$, $LiNi_{0.75}Mn_{0.25}O_2$, $LiNi_{0.25}Mn_{0.75}O_2$ or $LiNi_xCo_yM_{1-x-y}O_2$ where M is at least one member selected from the group consisting of Al, B, Sn, Mn and Nb, x satisfies $0.1 \leq x \leq 0.9$, and y satisfies $0.1 \leq y \leq 0.9$, the binder has an average particle size of from 50 to 150 nm, and the fluorinated copolymer has a weight average molecular weight of from 130,000 to 280,000.

2. The positive electrode material mixture for a non-aqueous secondary battery according to claim 1, wherein the cathode active material is $LiNi_xCo_yM_{1-x-y}O_2$ where M is at least one member selected from the group consisting of Al, B, Sn, Mn and Nb, x satisfies $0.1 \leq x \leq 0.9$, and y satisfies $0.1 \leq y \leq 0.9$.

3. The positive electrode material mixture for a non-aqueous secondary battery according to claim 1, wherein the cathode active material is included in the positive electrode material mixture in an amount of from 10 to 90 mass %, and the binder is included in an amount of from 0.1 to 20 parts by mass per 100 parts by mass of the cathode active material.

4. The positive electrode material mixture for a non-aqueous secondary battery according to claim 1, wherein the binder is in a form of an aqueous dispersion or emulsion of the fluorinated copolymer.

5. The positive electrode material mixture for a non-aqueous secondary battery according to claim 1, further comprising:

an electrically conductive material in an amount of from 0.1 to 30 parts by mass per 100 parts by mass of the cathode active material.

6. A process for producing a positive electrode for a non-aqueous secondary battery, which comprises:

applying the positive electrode material mixture for a non-aqueous secondary battery as defined in claim 1 to a current collector; and then removing the aqueous medium.

7. A non-aqueous secondary battery, comprising:
a negative electrode;
an electrolyte;
a separator; and
the positive electrode for a non-aqueous secondary battery obtained by the process as defined in claim 6.

8. The positive electrode material mixture for a non-aqueous secondary battery according to claim 1, wherein a total amount of the polymerized units derived from tetrafluoroethylene and the polymerized units derived from propylene polymerized units is at least 95 mol % of all polymerized units in the fluorinated copolymer.

9. The positive electrode material mixture for a non-aqueous secondary battery according to claim 1, wherein a total amount of the polymerized units derived from tetrafluoroethylene and the polymerized units derived from propylene polymerized units is at least 99 mol % of all polymerized units in the fluorinated copolymer.

10. The positive electrode material mixture for a non-aqueous secondary battery according to claim 2, wherein a total amount of the polymerized units derived from tetrafluoroethylene and the polymerized units derived from propylene polymerized units is at least 99 mol % of all polymerized units in the fluorinated copolymer.

11. The positive electrode material mixture for a non-aqueous secondary battery according to claim 1, wherein the cathode active material is $LiNi_{0.5}Mn_{0.5}O_2$.

12. The positive electrode material mixture for a non-aqueous secondary battery according to claim 1, wherein the cathode active material is $LiNi_{0.75}Mn_{0.25}O_2$.

13. The positive electrode material mixture for a non-aqueous secondary battery according to claim 1, wherein the cathode active material is $LiNi_{0.25}Mn_{0.75}O_2$.

14. The positive electrode material mixture for a non-aqueous secondary battery according to claim 1, wherein the cathode active material is $LiNi_{1/3}Co_{1/3}Mn_{1/3}O_2$.

15. The positive electrode material mixture for a non-aqueous secondary battery according to claim 1, wherein the binder has an average particle size of from 50 to 100 nm.

16. The positive electrode material mixture for a non-aqueous secondary battery according to claim 15, wherein the binder is in a form of an aqueous dispersion or emulsion of the fluorinated copolymer, and a concentration of the fluorinated copolymer is from 15 to 35 mass %.

17. The positive electrode material mixture for a non-aqueous secondary battery according to claim 16, wherein the binder is included in an amount of from 0.1 to 20 parts by mass per 100 parts by mass of the cathode active material.

18. The positive electrode material mixture for a non-aqueous secondary battery according to claim 16, wherein the binder is included in an amount of from 1 to 8 parts by mass per 100 parts by mass of the cathode active material.

* * * * *